3,091,297
Patented May 28, 1963

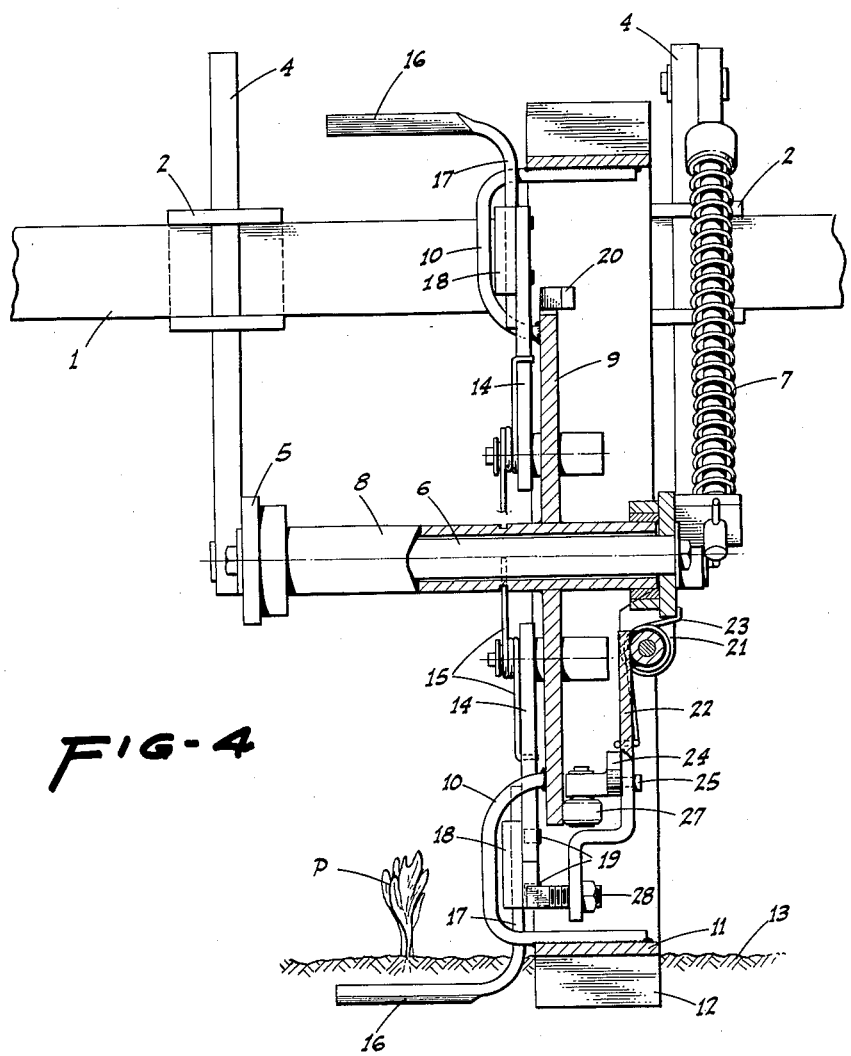
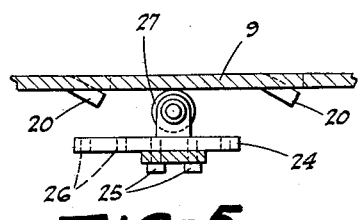

1

3,091,297
PLANT THINNER
Albert J. Matteoli, Sacramento, and Alvin N. Rocksvold,
Woodland, Calif.; said Rocksvold assignor to said
Matteoli
Filed May 14, 1962, Ser. No. 194,428
8 Claims. (Cl. 172—546)

This invention relates in general to plant thinning devices; the major object of the invention being to provide a novel wheel-type thinning device by means of which spaced stretches of ground along a row of plants are intermittently hoed or cultivated and the plants therein uprooted, while the plants between such stretches are left in an upstanding and untouched condition and ready for continuing growth. An important feature of the present device is that the hoeing and plant uprooting operation takes place in a direction lengthwise of the row, so that no dirt or plants tend to be thrown laterally and onto an adjacent row, as is the case with many previously devised thinning devices.

United States Patent No. 2,749,822, dated June 12, 1956, is directed to a plant thinner having the general objectives of the present invention. However, in that patent the operation of some of the elements is electrically controlled, while the present invention contemplates an all mechanical control system.

As in the above patent, the present invention contemplates the use of a wheel unit adapted to travel along a row of plants and which unit carries a plurality of thinning members normally rotatable with the wheel but with means operable to successively hold each thinning member temporarily against rotation with the wheel as such thinning member enters the ground, whereby the member will be dragged through the soil for a predetermined stretch of the row of plants, thus effecting a hoeing and cultivating action which cuts out the growth of plants along such stretch of the row.

A still further object of the invention is to provide a plant thinner which is practical, reliable, and durable, and one which is exceedingly effective for the purpose for which it is designed.

The objectives of the invention are attained by means of a structure and relative arrangement of parts set forth with particularity in the following specification and claims.

In the drawings:

FIG. 4 is a sectional view of the wheel unit taken on line 4—4 of FIG. 1.

FIG. 5 is a fragmentary sectional view of a cam and roller mechanism taken on a line 5—5 of FIG. 1.

Figure 1:
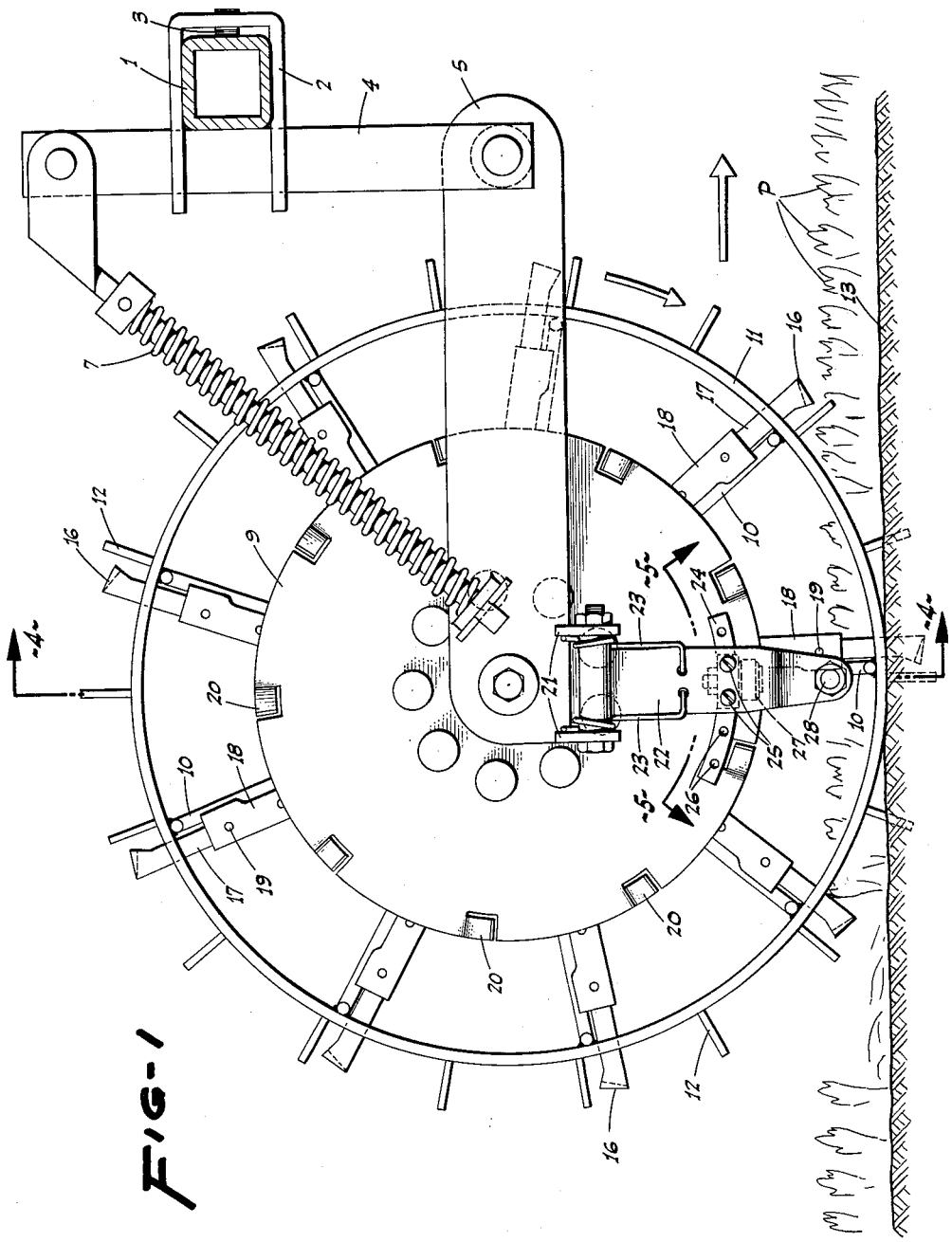
FIG. 1 is an elevation of one side of the plant thinner shown as mounted on the tool bar of any conventional vehicle such as a tractor or the like; the wheel unit of the thinner being shown in the position it assumes just prior to the dragging of a thinning member through a stretch of plants in the row.

Referring now to the drawings and the characters of reference marked thereon, the numeral 1 designates the supporting element of a tool bar as usually carried on either the front or rear of a conventional transport vehicle, such as a tractor or the like, and to which tool bar the improved plant thinner may be attached by U-clamps 2 and set screws 3, or other desired means.

Several of the plant thinning wheel units may be mounted on the same tool bar so that a number of rows of plants may be thinned at a time. However, the wheel units are identical so that a description of one will suffice for all.

The wheel unit is mounted on a supporting frame which may be of any desired construction. Preferably, however, the frame comprises a pair of spaced apart vertical attachment posts 4 adapted for rigid attachment to the tool bar 1 by the clamps 2. At the bottom of each post 4 is pivoted a horizontally projecting arm 5 between the free ends of which is disposed an axle 6. Interposed between the outer end of one arm 5 and the upper end of the related post 4 is a tension spring unit 7 of desired form functioning to permit an up and down swinging movement of the arms 5 controlled by the tension of the spring unit.

The wheel unit is mounted on a hub 8 rotatably mounted on the axle 6 and includes a disc-like cam plate 9 fixed rigidly on the hub 8. Disposed about one face of the cam plate 9 are a plurality of arcuate spokes 10 which curve outwardly beyond the plane of the one face of the cam plate, or in the lateral direction of the row of plants P to be thinned, and then inwardly or in the opposite direction to a position where they are rigidly attached to a wheel rim 11 which is spaced some distance radially out from the periphery of the cam plate 9. On the outer circumference of such rim 11 are grousers 12 adapted for entry into the ground 13, so that as the wheel unit is drawn over the ground by the transport vehicle the progressive engagement of the grousers with the ground will cause rotation of the wheel unit 9—10—11.

Pivotally mounted on the same face of the cam plate 9 from which the spokes 10 project and on pivots parallel to the hub 8 and in substantial parallelism with the spokes 10, are a number of thinning hoe-carrying arms 14 equal to the number of spokes 10 and disposed adjacent the spokes on the leading sides thereof relative to the direction of rotation of the wheel. Each arm 14 is normally yieldably held against such adjacent spoke 10 by a torsion spring 15 interposed between the hub 8 and an arm 14 so that in the rotation of the wheel, all the arms 14 rotate as a unit with the wheel as they are held against the spokes 10 by springs 15.

Each arm 14 carries on its lower end a thinning hoe 16 which is adjustable lengthwise of the arm by means of shanks 17 slidable through sleeves 18 on the outer ends of arms 14. The shanks may be fixed in any desired position in the sleeves by set screws 19, or any other desired means. See FIGS. 1 and 4. By means of this adjustment, the thinning hoes may be set to cut into the ground 13 to any selected depth.

On the face of the cam plate 9, opposite that on which the arms 14 are disposed, there are formed outwardly projecting cams 20; each cam being disposed substantially midway between the normal position assumed by adjacent arms 14, as shown quite clearly in FIG. 1.

At any suitable point, but preferably between brackets 21 depending from the arm 5 which lies adjacent the cams 20, is pivoted a depending arm 22. The axis of the pivot of the arm 22 lies at right angles to the axis of the cam plate 9 so that the arm 22 may swing toward and away from the face of such cam plate 9. The swing of the arm 22 is continuously yieldably held in the direction toward the cam plate by torsion springs 23 interposed between the fixed arm 5 and the swinging arm 22.

An arcuate bracket 24 is arranged to be adjustably positioned at different points against the inner face of the arm 22 by means of set screws 25 projecting through arm 22 and into adjustment bores 26 in the bracket 24. Affixed to the bracket 24 is a roller 27 normally held against the face of cam plate 9 by springs 23 and adapted to engage cams 20 as the wheel unit rotates, by which action the arm 22 is intermittently swung in a direction away from the face of the cam plate for a purpose as will appear.

A square headed stop bolt 28 projects outwardly from the lower end of the arm 22, and when the roller 27 is riding the face of the cam plate 9 this bolt projects into the path of travel of the hoe arms 14. As the roller rides one of the cams 20 however the stop bolt 28 is withdrawn from such path of travel against the pressure of the springs 23 which functions to return the stop bolt 28 to such path of travel as the roller leaves the cam. By means of the adjustment possible through the use of the bracket and set screw arrangement 24—26, the point at which the roller will ride the cam may be selectively determined which in turn will determine the length of time the stop bolt will remain in the path of travel of each hoe arm.

Figure 2:
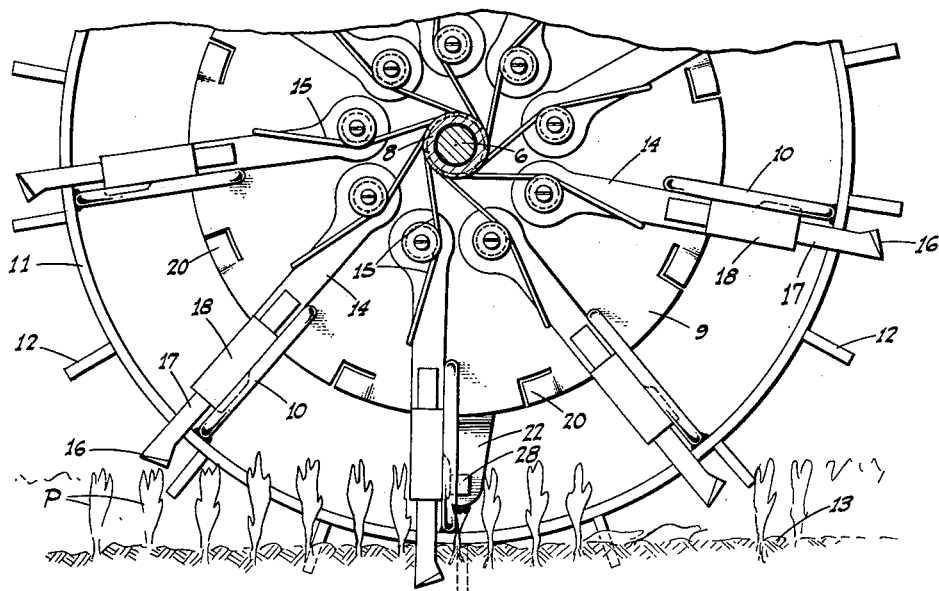
FIG. 2 is a fragmentary part of the wheel unit looking at the opposite side from that shown in FIG. 1, with the parts in the same position with respect to the row of plants.
Figure 3:
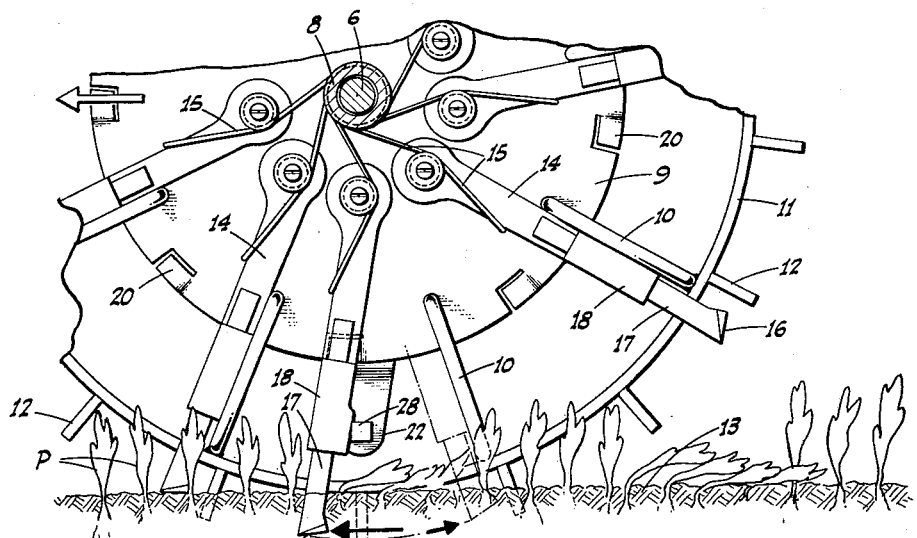
FIG. 3 is a fragmentary view of the unit looking at the same side as that shown in FIG. 2, but showing the plant thinner as having been dragged through a portion of that stretch of the row of plants to be thinned.

In operation, when a row of plants P is to be thinned, the thinning wheel unit is drawn along the ground adjacent the row of plants with the line of travel of the hoes 16 directly above the plants, as shown in FIG. 4. The engagement of the grousers 12 with the ground causes the entire wheel assembly to rotate about the axle 6. During the major portion of one complete rotation of the wheel, the arms 14—being held against spokes 10 by springs 15—rotate as a unit with the wheel. See FIGS. 1 and 2. However, as each arm approaches ground level it encounters stop bolt 28 which interrupts the rotative movement of the arm with the wheel and causes the arm and its attached thinning hoe to be dragged substantially horizontally through the ground (as shown in FIG. 3) thus effecting a cultivating and hoeing action which cuts or blocks out a stretch of the plants P. The length of such stretch is determined by the adjusted position of the roller 27, since when a cam moves adjacent the roller, and the latter rides the cam, the stop bolt 28 is withdrawn from the path of travel of the arm 14. Then, as the roller rides off the cam the related spring 15 returns the arm 14 to its normal position against its related spoke 10 where it again rides as a unit with the wheel and then moves through its rotary path of travel without further disturbing the ground surface. The arcuate space left between the blocked thinning hoe arm just before it is released and the succeeding thinning hoe arm is sufficient to leave one or more plants P disposed therebetween as may be determined by the adjustment means. Any such plant or plants, therefore, remain undisturbed.

From the foregoing description it will be apparent that the plant thinner is extremely simple and capable of effecting fast, efficient and automatic thinning of seeded row crops, such as beets, cotton, and the like, and wherein the hoe blades can be adjusted to chop out various selected blocks of plants. The hoeing action is such that it will not remove or throw soil away from plants, thereby retaining moisture around the plant or plants left in place and in the ground between the plants. A simple adjustment permits the hoes to be adjusted for any desired depth of cut. The operation of the thinner is effective to efficiently hoe out plants or weeds without disturbing the beds, merely chopping out such plants or weeds and leaving them to die in place. It is particularly good on hill planting for it does not break down the bed.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A plant thinning machine comprising a supporting frame, a rotatable wheel journaled on the frame and adapted to move over the ground surface adjacent a row of plants, an arm pivoted to the wheel on an axis substantially parallel with the axis of the wheel, means yieldably holding the arm in a fixed position with respect to the wheel whereby the wheel and arm will normally rotate as a unit, the arm projecting beyond the periphery of the wheel, a thinning hoe mounted on the outer end of the arm and adapted to enter and leave the ground with the rotation of the wheel, a yieldable stop means mounted on the frame and normally projecting into the path of travel of the arm as it travels with the wheel and enters the ground, whereby the rotary travel of the arm with the wheel will be interrupted and the hoe dragged for a predetermined distance through the ground in substantial parallelism with the ground surface, and means mounted on the wheel and effective to push the stop means out of the path of travel of the arm after such hoe has travelled such predetermined distance through the ground.

2. A machine, as in claim 1, in which the wheel comprises a hub, a flat plate mounted on the hub, and spokes fixed to the face of the plate and projecting outwardly therefrom and then bending back and intersecting the plane of the face of the plate, the arm being normally held in engagement with one of the spokes.

3. A plant thinning machine comprising a supporting and draft frame, a rotatable wheel journaled on the frame and including a rim adapted to engage and move over the ground adjacent and to one side of a row of plants, an arm disposed generally radially of the wheel adjacent and laterally out from the rim and pivoted at its radially inner end on the wheel relatively close to the hub on an axis parallel to the wheel axis, means yieldably holding the arm in a fixed position with respect to the wheel whereby the wheel and arm will normally rotate as a unit, a thinning hoe secured on the outer end of the arm and disposed radially out from and to one side of the wheel rim to enter and leave the ground as the wheel rotates, a stop positioned to engage the trailing side of the arm adjacent its outer end when the hoe is in the ground, a depending arm mounted on the frame for yielding movement laterally out from the wheel and on which arm the stop is fixed, and means including a cam on the wheel to engage and move said depending arm when the hoe enters the ground to disengage the stop from the first named arm and maintaining the depending arm thus moved during a predetermined arc of movement of the wheel.

4. A machine, as in claim 3, in which the cam faces in the direction of the depending arm and said last named means comprises an element mounted on the depending arm in facing relation to the cam for engagement thereby.

5. A plant thinning machine comprising a supporting and draft frame, a rotatable wheel journaled on the frame and including a rim adapted to engage and move over the ground adjacent and to one side of a row of plants, an arm disposed generally radially of the wheel adjacent and laterally out from the rim and pivoted at its radially inner end on the wheel relatively close to the hub on an axis parallel to the wheel axis, means yieldably holding the arm in a fixed position with respect to the wheel whereby the wheel and arm will normally rotate as a unit, a thinning hoe secured on the outer end of the arm and disposed radially out from and to one side of the wheel rim to enter and leave the ground as the wheel rotates, a stop positioned to engage the trailing side of the arm adjacent its outer end when the hoe is in the ground, a depending arm mounted on the frame for yielding movement laterally out from the wheel and on which arm the stop is fixed, a disc formed with the wheel, a cam on the disc disposed radially inward from the rim and facing away from said one side of the wheel and toward the depending arm, and an element on the depending arm intermediate its ends facing toward the cam and positioned for engagement thereby when the hoe is in the ground, the cam being arranged to then cause the depending arm to be moved laterally out and the stop to be disengaged from the first named arm during a predetermined arc of movement of the wheel.

6. A machine, as in claim 5, with means mounting the element on the depending arm for adjustment thereon in a direction circumferentially of the wheel; the last named means comprising an arcuate bracket concentric with the wheel on which the cam engaging element is mounted, and means adjustably securing the bracket on the back side of the depending arm for adjustment thereon lengthwise of the bracket. while maintaining the same in such concentric relation to the wheel.

7. A machine, as in claim 5, in which the disc terminates short of the rim and is disposed adjacent and laterally inward of the first named arm, and said means to hold said arm in said position comprises spokes connecting the disc and rim, one spoke intermediate its ends overlapping said arm on its trailing side for engagement thereby.

8. A machine, as in claim 3, including means to secure the hoe on the first named arm for adjustment thereon radially of the wheel.

References Cited in the file of this patent

UNITED STATES PATENTS

| | | |
|---|---|---|
| 5,665 | Young | July 11, 1848 |
| 1,174,921 | Wilson | Mar. 7, 1916 |
| 2,749,822 | Matteoli | June 12, 1956 |